United States Patent [19]

McRae, Jr. et al.

[11] 3,929,076
[45] Dec. 30, 1975

[54] MEANS OF HIGH MASS FLOW TRANSPORTATION

[75] Inventors: William V. McRae, Jr., Anaheim; John J. Stuart, Jr., Newport Beach, both of Calif.

[73] Assignee: Transyt Corporation, Newport Beach, Calif.

[22] Filed: Sept. 7, 1973

[21] Appl. No.: 395,243

Related U.S. Application Data

[60] Division of Ser. No. 185,126, Sept. 30, 1971, Pat. No. 3,769,913, which is a continuation of Ser. No. 765,550, Oct. 7, 1968, abandoned.

[52] U.S. Cl. .................. 104/25; 104/18; 104/20; 198/38; 104/88; 198/110
[51] Int. Cl.² ................................................ A63G 1/00
[58] Field of Search ................. 104/18, 20, 25, 88; 198/110, 38

[56] References Cited
UNITED STATES PATENTS

| | | | |
|---|---|---|---|
| 3,421,450 | 1/1969 | Bell | 104/25 |
| 3,483,829 | 12/1969 | Barry | 104/18 |
| 3,485,182 | 12/1969 | Crowder | 104/25 |
| 3,580,182 | 5/1971 | Bouladon | 104/25 |
| 3,734,025 | 5/1973 | Shoemaker | 104/18 |

*Primary Examiner*—M. Henson Wood, Jr.
*Assistant Examiner*—D. W. Keen
*Attorney, Agent, or Firm*—Lyon & Lyon

[57] ABSTRACT

A high mass flow transportation system wherein one or several interconnecting track loops guide corresponding endless chains of car carriers past a series of fixed stations; each carrier being adapted to receive a removable passenger car, there being distributed sets of carriers in each chain precoded to receive only those cars destined for delivery to corresponding stations; and further, each station includes conveyors which remove and decelerate passenger cars destined for that station to permit unloading and loading of passengers, then accelerate the cars for return to empty carriers coded for other selected stations.

The transportation system is also capable of accomodating cargo containers, or passenger vehicles interspersed with the passenger cars for delivery to selected stations and capable of removal from the system, in which case the vehicles may be self-propelled for use separate from the system.

19 Claims, 39 Drawing Figures

FIG. 1

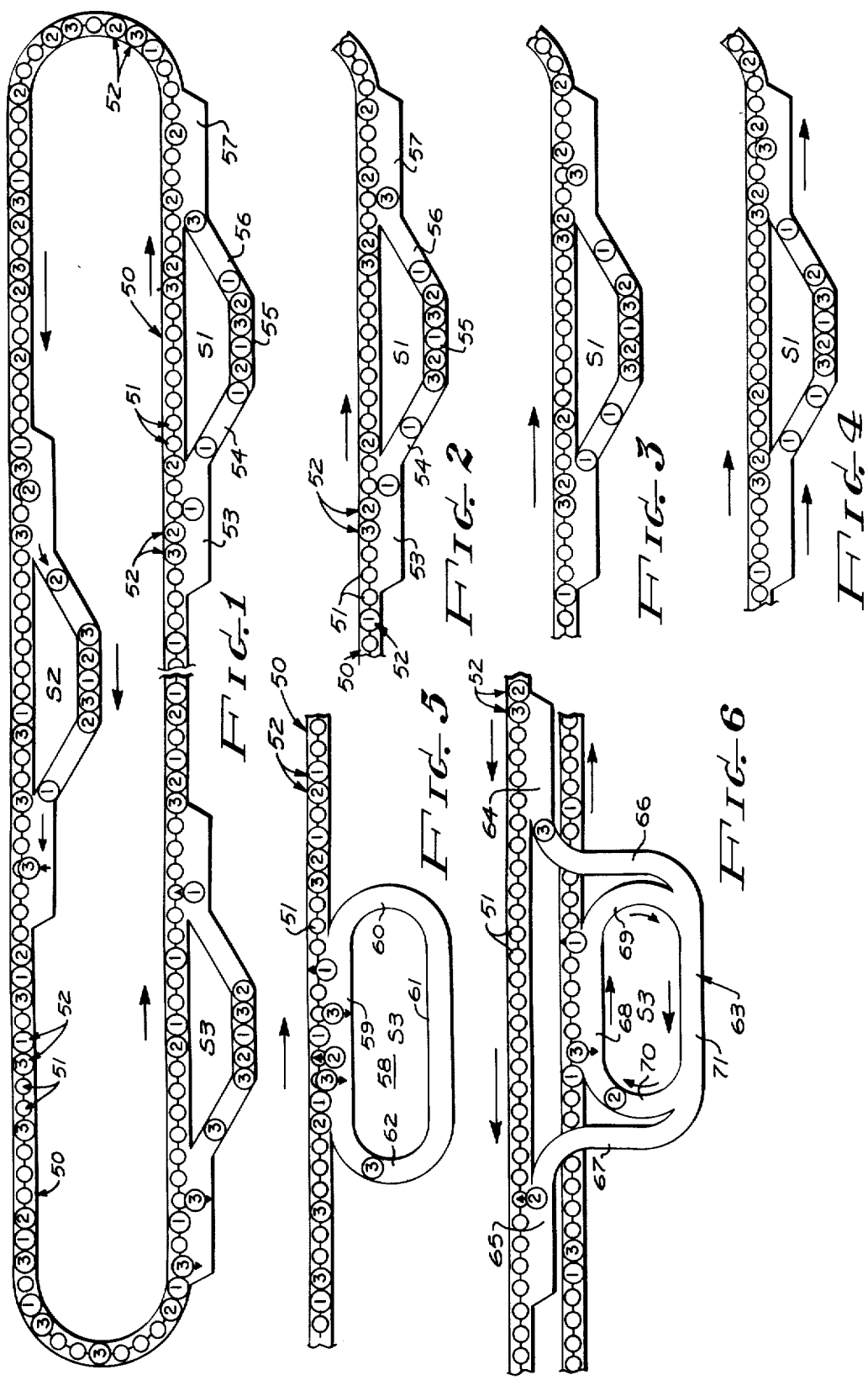

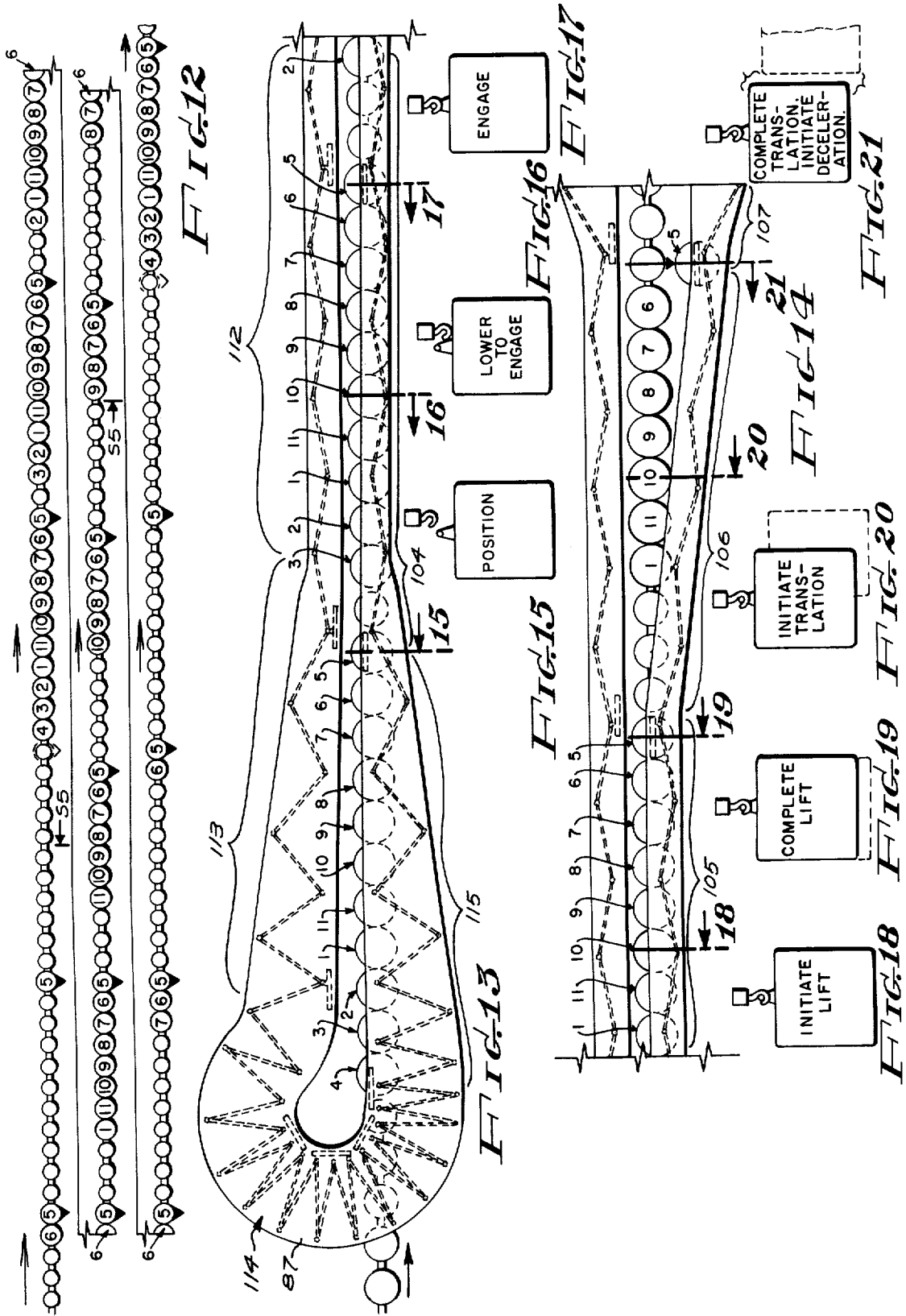

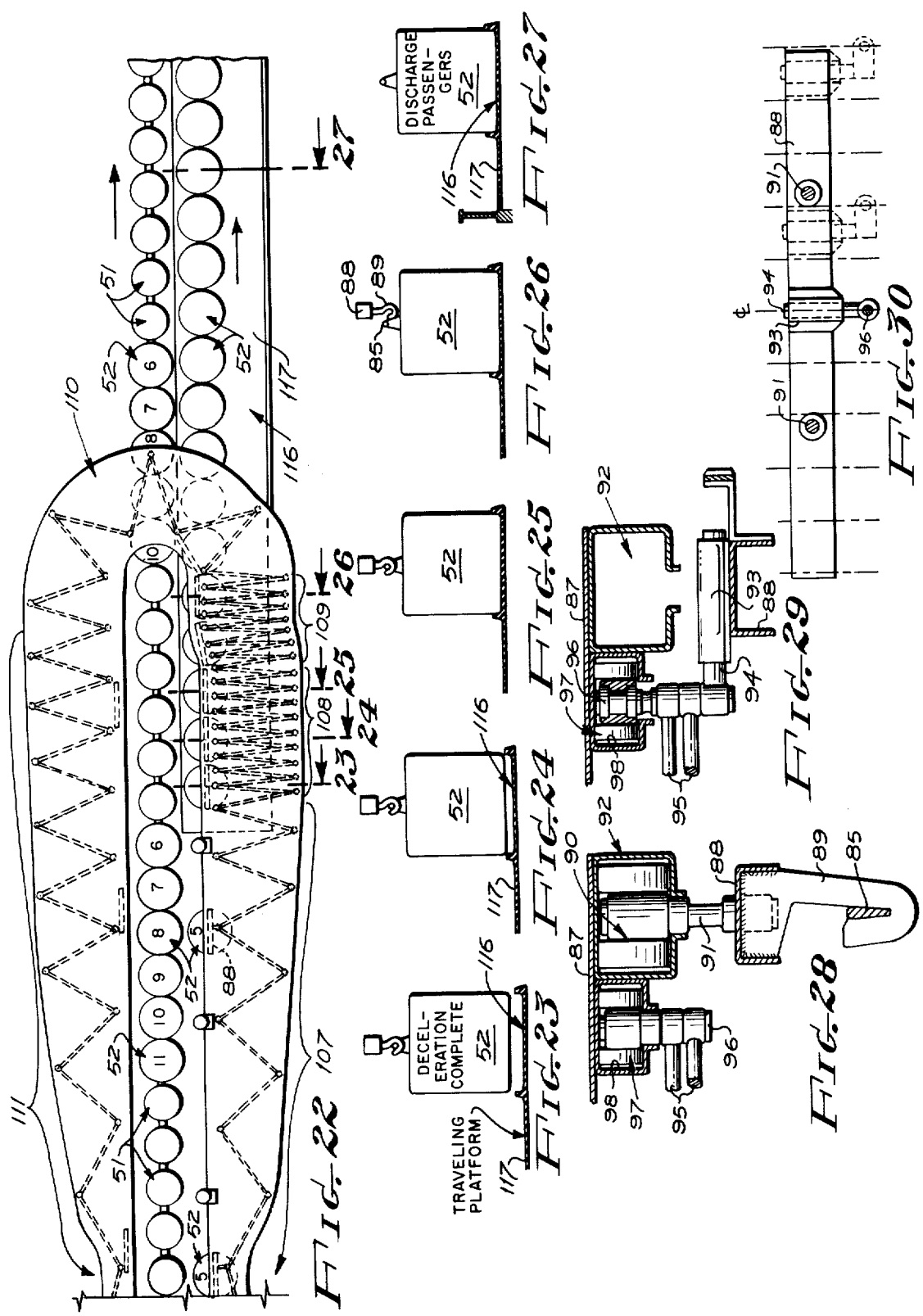

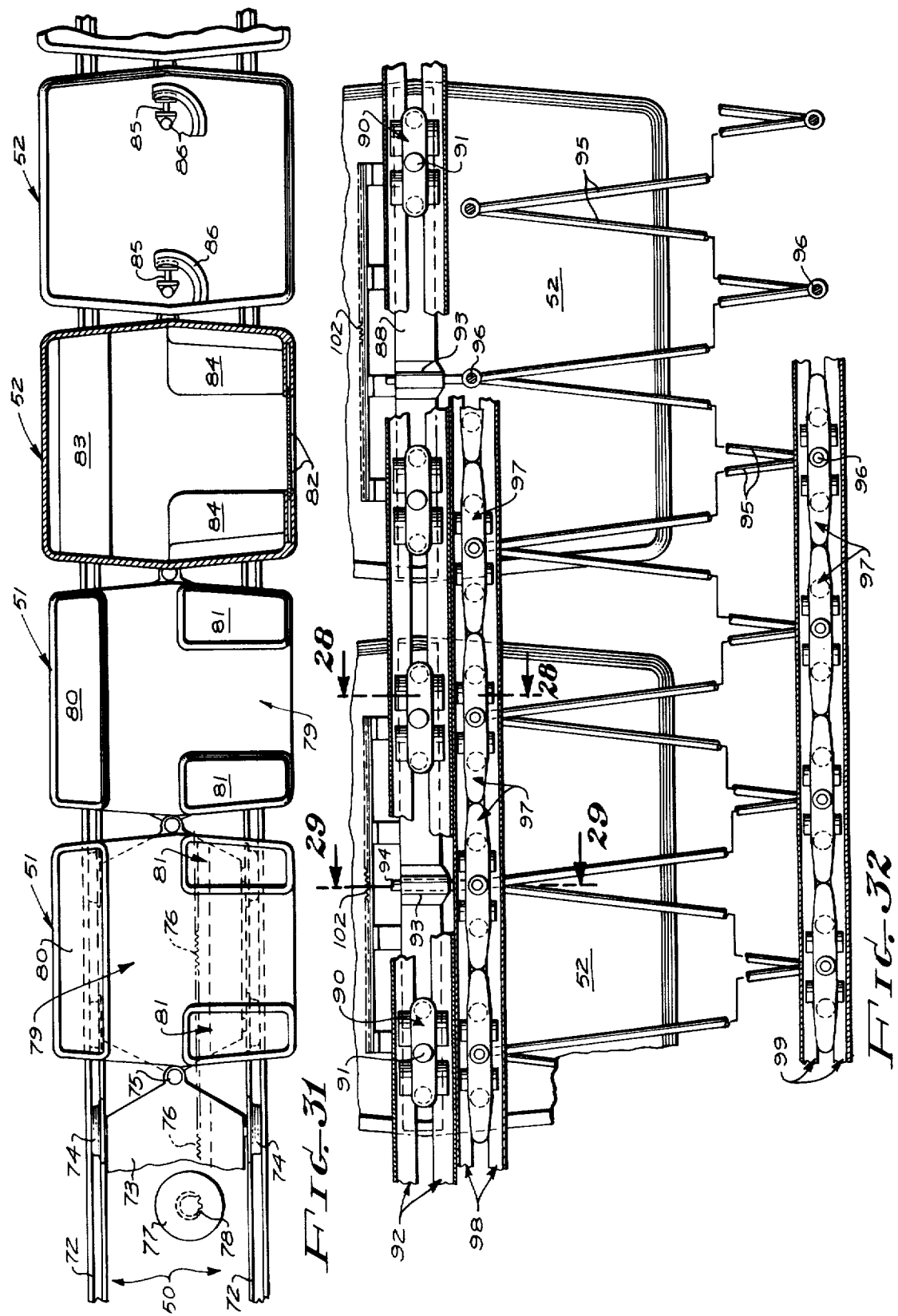

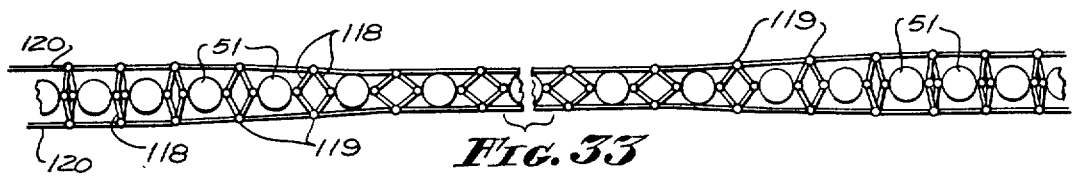
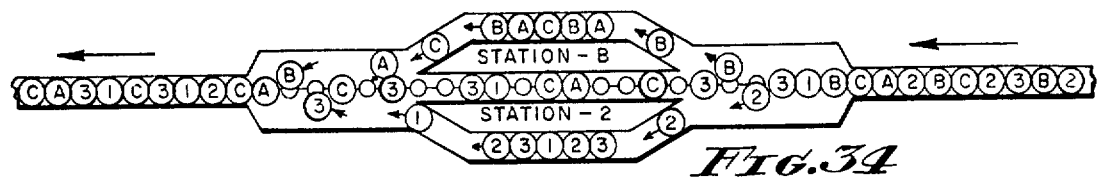
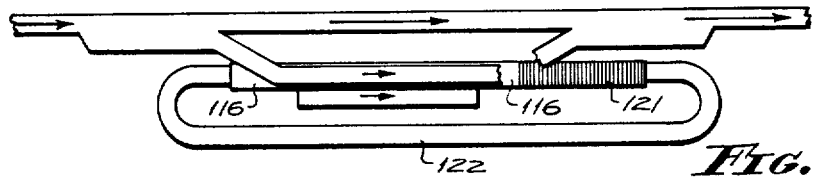
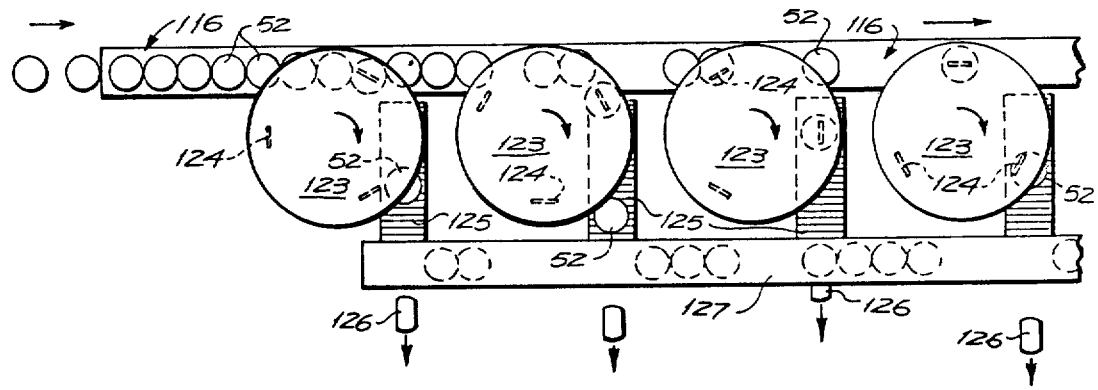
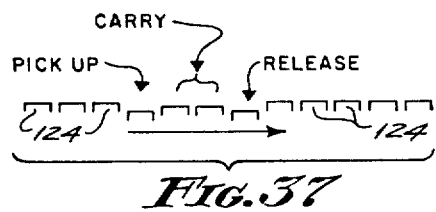

MEANS OF HIGH MASS FLOW TRANSPORTATION

This is a division of application Ser. No. 185,126, filed Sept. 30, 1971, now U.S. Pat. No. 3,769,913, which is a continuation of application Ser. No. 765,550 filed 10/07/68 now abandoned.

BACKGROUND OF THE INVENTION

Transportation systems may be classified broadly into (1) stop-go systems and (2) origin-destination systems. The stop-go systems may be further classified as (a) batch systems and (b) continuous systems. Batch systems are discontinuous in both time and space; that is, service is provided between discrete locations on an intermittent basis, i.e., in "batches." Subways, trains, and often express and intercity buses or street cars are examples.

From the passengers' standpoint, the batch systems in use involve a long series of waiting lines, a waiting period before boarding a car, then a waiting period until the car is filled; then a waiting period until the car can be entered into traffic, for example, the express line. Even here there are switching operation delays so as to mesh properly into the other traffic. If the car moves between more than two points, there are further waiting periods at each intervening station. If the distance between stations is short, there is no opportunity to accelerate to an express speed in order to compensate in part for the delays.

Continuous systems, in contrast, incorporate continuous access in time. Service is provided on a continuous basis, usually between discrete locations; for example, the system disclosed in U.S. Pat. No. 2,756,686. Also continuous access in terms of space has been considered; for example, the moving sidewalk.

Many, but not all, of the delays inherent in a batch system are reduced or eliminated in a continuous system. Thus, for a given top speed continuous systems can offer a performance advantage to the user in terms of time required between point A and point B, especially in the case of short haul transportation. However, the permissible top speed is less and the danger of entering or leaving the vehicle is greater than in a batch system.

Furthermore, the safety constraints that must be imposed on boarding operations seriously limit the mass flow achievable in continuous systems.

Recent attention has been focused on origindestination systems which eliminate many of the in-transit delays inherent in transporation systems by routing passengers directly to their destination. However, all origin-destination systems prior to the present invention, for example, the system disclosed in U.S. Pat. No. 3,403,634, utilize computer control concepts which permit direct passenger control of vehicular destination. This passenger control produces an element of randomness in vehicular scheduling which can pose a severe problem for complex networks. The interference that results from random scheduling in large networks so limits the mass flow capability of a single line that the requirements of congested portions of urban areas cannot be met without the expense of adding multiple lines. The interference also creates a serious potential for in-station delays of passengers.

SUMMARY OF THE INVENTION

The present invention seeks to retain the passenger appeal and transit time advantages of the origin-destination type of operation without the serious disadvantages and interferences that result from random operations of all prior origin-destination systems. Furthermore, the present invention seeks to incorporate the advantages of the batch and continuous types of systems while eliminating their disadvantages. Accordingly, included in the objects of this invention are:

First, to provide a means of mass transportation which combines the concept of an endless chain of carriers moving at a constant speed with the concept of a series of fixed passenger stations; this being accomplished by dividing the carriers into sets, each coded to receive passenger cars destined for delivery only to a corresponding station; then removing at each station the cars destined therefor, decelerating the cars to a speed which permits passenger unloading and loading, accelerating the cars to carrier speed, and placing the cars on empty carriers coded for other selected stations.

Second, to provide a means of mass transportation in which the relation between occupied and unoccupied carriers is determined by a mathematical formula which enables the chain of carriers and the series of car handling conveyor systems at the stations to operate in mechanical synchronism to ensure a vacant carrier space for each car as it leaves a station, the mathematical formula permitting a 50 per cent loading of the carriers passing between stations.

Third, to provide a transportation system, as indicated in the preceding object, wherein the passenger cars in each station, on being decelerated and vacated, are assembled for rerouting to other stations and may be automatically selected for a predetermined station or may be manually selected by a boarding passenger for a selected station, in either case, the sequence of delivery to the chain of carriers being determined by the mathematical formula previously referred to.

Fourth, to provide a mass transportation system wherein the mathematical formula previously referred to permits the simultaneous use of two groups of cars, each group occupying a maximum of up to 50 per cent of the total carriers, moving between stations, this being accomplished by arranging the second set of cars in accordance with a second mathematical formula which is complementary, or in essence, a mirror image of the initial mathematical formula.

Fifth, to provide a transportation system of the type indicated in the preceding objects which incorporates at each station a novel conveyor system synchronized with the movement of the cars on the chain of carriers and having a series of passenger car handling mechanisms which pick up in sequence those passenger cars destined for the particular station, move each car clear of the chain of carriers, then decelerates the car and deposits the car on a slowly moving belt or platform so that passengers may unload or load, the handling mechanisms then reaccelerating and returning to position to pick up other passenger cars; a similar conveyor system, also synchronized with the chain of carriers, being employed to pick up the passenger cars from the belt, accelerate them to carrier speed and deposit them on vacant carriers for delivery to other predetermined stations.

Sixth, to provide a transportation system which is readily adaptable to changing conditions of demand; that is, the system may be readily expanded without degrading performance in the initial route by the addition of stations in a single loop or other loops having multiple stations may be added, a station in one loop may serve as a transfer station to or from another loop.

Seventh, to provide a transportation system wherein the entire system of carrier loops may operate at the same speed or selected loops may operate at a higher speed in which case a passenger car may move from a station onto a lower speed loop, then may transfer, in a similar manner, to a higher speed loop; thus, the system may include lower speed loops located in several towns interconnected by higher speed or "express" loops.

Eighth, to provide a mass transportation system which can be adapted to handle simultaneously pedestrian passengers, cargo and passenger vehicles without interference; that is, the pedestrian, cargo and vehicles may enter and leave from isolated parts of the stations, or from separate stations even though, when placed on the carriers, they may be interspersed.

Ninth, to provide a mass transportation system wherein passenger, cargo or vehicle waiting time is minimized thereby reducing the speed at which the carriers must travel to transport the passenger, cargo or vehicles between stations while maintaining an overall time between entrance into the system and exit therefrom which is comparable if not better than present means of travel both public and private; thus, by reason of minimizing delays, high speeds may be avoided, passenger comfort and safety are improved, and maintenance costs are minimized.

DESCRIPTION OF THE DRAWINGS

FIG. 1 is a diagrammatical plan view, showing a simple form of the mass transportation system, involving three stations.

FIGS. 2, 3 and 4 are similar diagrammatical views, showing one of the stations in time sequence to indicate a typical movement of cars therethrough.

FIG. 5 is a similar fragmentary diagrammatical plan view, showing a station in the form of a loop in which the car receiving and car discharging sections are in overlapping relation.

FIG. 6 is a similar fragmentary plan view, showing a station arrangement in connection with two carrier chain for handling traffic moving in opposite directions.

FIG. 12 is a fragmentary diagrammatical plan view of a portion of the transporation system, illustrating a typical pattern of passenger cars interspersed with a corresponding pattern of empty carriers.

FIG. 13 is a fragmentary essentially diagrammatical plan view of a conveyor system located at a typical station, showing particularly that portion or section which engages selected cars from a chain of carriers.

FIG. 14 is a similar view, continuing from FIG. 13, and showing that section in which the cars are lifted and moved clear of the corresponding carrier.

FIGS. 15, 16 and 17 are enlarged essentially diagrammatical views of a typical car and adjacent portion of the conveyor taken from positions 15, 16 and 17 of FIG. 13.

FIGS. 18, 19, 20 and 21 are similar diagrammatical views of a typical car taken from positions 18, 19, 20 and 21 respectively of FIG. 14.

FIG. 22 is a diagrammatical view of the conveyor system, which is a continuation of FIG. 14.

FIGS. 23, 24, 25, 26 and 27 are diagrammatical views of a typical car and adjacent portion of the conveyor taken from positions 23, 24, 25, 26 and 27 respectively of FIG. 22.

FIG. 28 is an enlarged fragmentary sectional view, taken through 28—28 of FIG. 32, showing one of the car supporting hooks and adjacent portion of the linkage mechanism.

FIG. 29 is an enlarged fragmentary sectional view, taken through 29—29 of FIG. 32, showing the manner in which the linkage mechanism is connected to the car transporting mechanism.

FIG. 30 is a plan view of one of the car carrying beams, indicating by dotted lines and broken lines, various locations of the mass which connect the car carrying beam to the linkage assembly.

FIG. 31 is a fragmentary plan view, showing a section of track and a series of carriers and passenger cars thereon.

FIG. 32 is a fragmentary view of the conveyor showing the conveyor tracks in section and a pair of passenger cars thereunder, this view being taken within the region represented by positions 24 and 25 of FIG. 22.

FIG. 33 is a diagrammatical view, indicating a means whereby the carriers may be reduced in speed as they approach a station and increased in speed as they leave a station, to provide increased speed between stations.

FIG. 34 is a fragmentary diagrammatical view, showing a single station, and indicating a mathematical pattern of a dual system in which a second group of cars are disposed in the spaces between the cars of a first group to increase the density of the transportation system.

FIG. 35 is a fragmentary diagrammatical view, showing a single station, and indicating a means whereby a passenger car may be aborted or removed from the system in case of emergency or other reason.

FIG. 36 is a diagrammatical view, showing fragmentarily a portion of a station, which has been modified to handle cargo or vehicles, indicating particularly the unloading sequence.

FIG. 37 is a diagrammatical view, indicating the vertical pattern of movement of a car removing unit.

Figure 7:
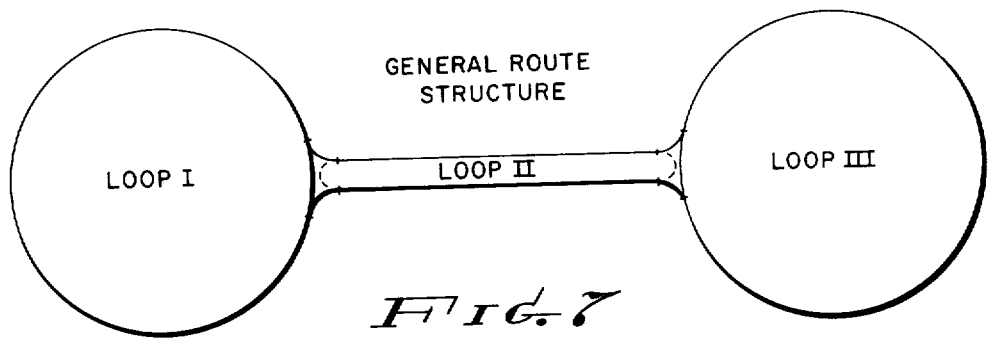
FIG. 7 is a diagrammatical plan view, illustrating one manner in which two essentially local units or loops may be connected by a higher speed or express loop.

In its simpler form, the mass transportation system includes a track loop 50, represented diagrammatically in FIG. 1. The track loop is provided with a continuously moving, endless chain of carriers 51, each of which is adapted to removably support a passenger car 52. The construction of the carrier and the passenger car will be set forth in more detail hereinafter. To simplify the illustration in FIG. 1, and also in FIGS. 2 through 6, the carriers 51 are represented by smaller circles, while the passenger cars are presented by larger circles, and the track is represented by boundary lines enclosing the carriers and cars. The track loop 50 indicated in FIG. 1 serves three stations, designated S1, S2 and S3. In practice, of course, the number of stations are substantially greater. A set of passenger cars is designated for each station, and are marked 1, 2 and 3, as will be brought out later in more detail. Each car on entering a station is, before being loaded, redesignated with another number corresponding to its next station, unless, of course, it is a round-trip car.

As will be noted in FIG. 1, the passenger cars or vehicles are arranged in a particular pattern which provides a corresponding pattern of empty or unoccupied carriers. These patterns are so established that the vehicle schedule can be completely predictable and equally predictable is the availability of openings or unoccupied carriers at the proper positions to receive passenger cars from the different stations. A representative condition for sequencing on a single track loop or line, such as shown in FIG. 1, is substantially as follows:

a. $'LOAD = K (V_b/V_p + 1)l_c$
b. $'UNLOAD = K (V_b/V_p)l_c$
c. $n = V_b/V_p$ where:

$V_b$ = The constant velocity of the chain of carriers, or the cars on the track loop at least in the vicinity of the station.

$V_p$ = The constant velocity of the cars or car moving means at the entrance to and exit from the loading and unloading sections of the station.

$l_c$ = The center-to-center length between carriers, or contiguous cars.

$K$ = Car density constant, 50 percent line density between stations achieved when $K = 1$.

$n$ = The maximum number of cars targeted for separate station destinations that can be loaded at any station before the pattern of occupied and unoccupied car carriers on the track loop repeats itself at that station.

$'LOAD$ = The distance on the chain of carriers, at least in the vicinity of the stations, between unoccupied carriers that are loaded from a given station, or the distance between the spaces in the loop that are filled by cars from a given station at least in the vicinity of the station.

$'UNLOAD$ = The distance on the chain of carriers, at least in the vicinity of the stations, between carriers that may be occupied with cars for unloading at a given station, or the distance between spaces on the chain of carriers, at least in the vicinity of the station, from which cars may be unloaded at a given station.

It will be noted from FIG. 1 that the cars travel in "clumps." More particularly, for the case illustrated, a clump of three cars is followed by three vacant carriers or spaces, one car followed by two vacant carriers or spaces, then two cars followed by one vacant carrier or space. Furthermore, not only does the pattern of clumps repeat, but the sequence of target or station designations within a clump repeats within each segment between stations. This pattern can be generalized to a track loop which has been loaded to produce a 50 percent line density between stations as:

Pattern approaching $m^{th}$ station = $n$ cars (the first of which is targeted for station m) followed by $n$ empty spaces; then one car targeted for station $m$ followed by $n-1$ empty spaces; then two cars (the first of which is targeted for station $m$) followed by $n-2$ empty spaces; and so forth out to $n-1$ cars (the first of which is targeted for station $m$) followed by one empty space; and then repeating the pattern of $n$ cars, $n$ empty spaces, etc.

where
$m$ = any station in the loop
$n = V_b/V_p$ as defined above

Thus, the time history of cars, including round trip, arriving and departing at an in-line station in a three-station system wherein $V_b/V_p = 3$ would, according to the above equations, follow the pattern illustrated in FIGS. 1 through 4 for 50 percent traffic density conditions between stations.

Each station includes a transfer section 53 in which the cars designated for the particular station are moved off their respective carriers and clear of the track loop. The transfer section joins a decelerating section 54, which joins an unloading-loading section 55, that in turn connects to an accelerating section 56, which joins a transfer section 57 in which the cars are moved onto corresponding carriers as the cars and carriers move at the same speed.

As indicated in connection with station S1 of FIG. 1, and the corresponding station shown in FIGS. 2, 3 and 4, all cars entering station S1 are designated 1. However, the cars in the loading portion of the station are redesignated in a pattern to correspond with the series of unloaded carriers which will mate with the cars in the transfer section 57. In this regard, it should be noted that a condition is illustrated in which 50 percent of the carriers traveling between stations are occupied. Consequently, a set of cars designated 1, leave station 1 and complete the entire track loop, returning to station 1 without stopping at the other stations.

While the stations shown in FIGS. 1 through 4 are essentially linear, it is possible, in order to shorten the effective length of the station, to arrange the station in the form of a loop, as indicated by 58 in FIG. 5. Such an arrangement includes a transfer section 59, moving at the same speed as the chain of carriers, a decelerating section 60, an unloading-loading section 61, and an accelerating section 62. The loading-unloading section, of course, moves slow enough that passengers may leave or enter the passenger cars safely.

In order that the transportation system may handle traffic moving in both directions, a pair of track loops may be arranged in parallel contiguous relation, either side by side or one above the other. Two stations may be provided, side by side or one above the other, each handling traffic in one direction. It is possible, however, as indicated in FIG. 6, to provide a two-way station, as indicated by 63. That portion of the station servicing one of the track loops is provided with transfer sections 64 and 65, similar to the transfer stations 53 and 57 shown in FIG. 1. These join, respectively, to a deceleration section 66 and acceleration section 67. The other portion of the station includes a single transfer section 68, which receives cars from the corresponding track loop and returns cars thereto, and is connected at its ends to deceleration section 69 and an acceleration section 70. Both deceleration sections 66 and 69 and the acceleration sections 67 and 70 connect to a common loading and unloading section 71.

The synchronized sequencing of loading and unloading operations which is a primary feature of the herein disclosed transportation system can be extended to route structures more complex than a simple loop, such as shown in FIG. 1, by the straightforward use of appropriate switching devices to interconnect various track loops. This interconnection can even be accomplished using essentially the same car conveyor means that is used at each passenger station which will be described later.

By adjusting these factors, a variety of projected traffic patterns can be accommodated within a given system route. For example, a possible route using interconnected loops is depicted in FIG. 7. Loops designated I and III of this example serve relatively centralized areas. They are connected by an "express line" utilizing Loop II. This overall route structure could be characteristic of a number of plausible transportation markets such as two closely spaced urban areas or a downtown area and an airport complex, etc. This same example route could be designated to accommodate many of the other specific markets that are of this type by adjusting the mass flow of each loop to fit the projected traffic requirements. Similarly, changes in requirements over time could be accommodated for a given route by mass flow adjustments.

The means for adjusting the system mass flow involves the control of the velocities of the car carriers and the loading and unloading sequence between the various loops. To illustrate some of the options available, two fundamental traffic variations are discussed below for the route structure of FIG. 7.

1. EQUAL DEMAND

If the demand for service is approximately the same for transportation between any two stations throughout the entire route, each station in each loop would load a complete complement of cars targeted for every other destination. For example, if 22 stations were distributed along the various loops in the manner shown in FIG. 8, then each station would load a repeating pattern of 22 cars (assuming a round trip car was included). If the beltway velocities and the moving platform velocities were adjusted to 50 percent line mass flow conditions ($V_b/V_p = 22$) in Loops I and III, then the pattern of cars on the main beltway of these loops would be of the form: 22 cars, 22 spaces, 1 car, 21 spaces, 2 cars, 20 spaces . . . 21 cars, 1 space, 22 cars, etc.

Since this pattern would be repeated throughout all of Loops I and III (except over the transfer section at the stations themselves), this would be the sequence of cars approaching the switching points X and Y on the main loops. In order to switch the express cars onto Loop II, it would be necessary to transfer and accelerate cars more frequently at points X and Y than at a station. This is due to the fact that in any given sequence of 22 car spaces on Loops I and III, there will never be more than one car targeted for a particular station (for the example shown). However, in the same interval there could be up to 22 round-trip cars targeted for loop-to-loop transfer via loop II.

Thus, although the same type of transfer mechanism could be used at points X and Y as at the stations, the minimum interval between the transfer points incorporated into the mechanism must be considerably shorter. In fact, because of the round-trip cars, the transfer mechanism must periodically be able to handle a series of contiguous cars with no spaces between them. Even if round-trip cars are not included, such clumping of transfer requirements would still be imposed if cars targeted for destinations in the remote loop are loaded sequentially at each station. However, if the remote loop cars are alternated in the station loading sequence with cars targeted for the originating loop, the switching points X and Y would never have to transfer contiguous cars. The most frequent transfer requirement would be every other car out of a contiguous group.

Since this choice of station loading sequence will affect the switching of cars onto Loop II, it will also affect the pattern of cars on this loop. This will, in turn, impact the other side of the switching requirement at points X and Y, i.e., the pattern of cars that have to be switched off of Loop II. This pattern, however, is not fully specified without identifying the beltway velocities of the various loops. If the beltway velocity in Loop II is the same as that in Loops I and III, then the spacing of cars in Loop II will simply be the same as in Loops I and III with the exception that any "local cars" (i.e., cars that are targeted within their originating loop) will be replaced by empty spaces in the Loop II pattern.

Figure 8:
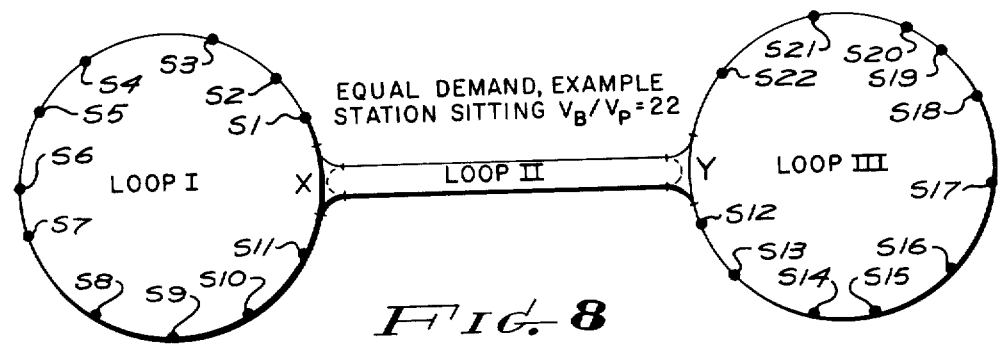
FIG. 8 is a plan view, similar to FIG. 7, showing the system with a relatively few stations.

For example, if (1) round-trip cars are included (and transferred en masse), (2) the station loading sequence alternates cars targeted for remote and originating loops, and (3) all beltway velocities are equal, the pattern of cars on Loop II of the 22 station example shown in FIG. 8 would be:

22 cars, 22 spaces, 1 car, 21 spaces, 1 car,
21 spaces, 1 car, 1 space, 1 car, 19 spaces, 1 car,
1 space, 1 car, 19 spaces, 1 car, 1 space, 1 car,
1 space, 1 car, 17 spaces, 1 car, 1 space, 1 car,
1 space, 1 car, 17 spaces . . . 1 car, 1 space, 1 car,
1 space, 1 car, 1 space, 1 car, 1 space, 1 car, 1 space,
1 car, 1 space, 1 car, 1 space, 1 car, 1 space, 1 car,
1 space, 1 car, 3 spaces, 1 car, 1 space, 1 car,
1 space, 1 car, 1 space, 1 car, 1 space, 1 car,
1 space, 1 car, 1 space, 1 car, 1 space, 1 car,
1 space, 1 car, 1 space, 1 car, 3 spaces, 1 car,
1 space, 1 car, 1 space, 1 car, 1 space, 1 car,
1 space, 1 car, 1 space, 1 car, 1 space, 1 car,
1 space, 1 car, 1 space, 1 car, 1 space, 1 car,
1 space, 1 car, 1 space, 22 cars . . . .

However, the condition of equal beltway velocities may be academic in view of the potentially express nature of Loop II.

If the beltway velocity in Loop II is higher than Loops I and III, the same basic sequence of cars as depicted above would be apprpriate, but the distance between cars would be increased.

2. UNEQUAL DEMAND, LIMITED EXPRESS SERVICE

If the demand for local service dominates the demand for express service between Loops I and III, the appropriate pattern and sequencing of cars on the various loops will not be the same as described for the equal demand case. This will follow from the fact that each station in each loop will not load a complete complement of cars targeted for every other destination in each repetitive loading cycle.

The pattern and sequencing that will result on the various loops will vary depending on what approach is adopted for providing the express service. One possibility would be to provide express service only between a limited number of stations — on Loops I and III. This approach, however, would necessitate some passenger transfers at the express stations. An alternate approach which would avoid this requirement would be to treat the switching points X and Y as "dummy" stations. In other words, out of every repetitive cycle of cars loaded at a station in Loop I, one car would be targeted for station "X" or the transfer point. Only this car out of a cycle would then be transferred onto the express loop.

Figure 9:
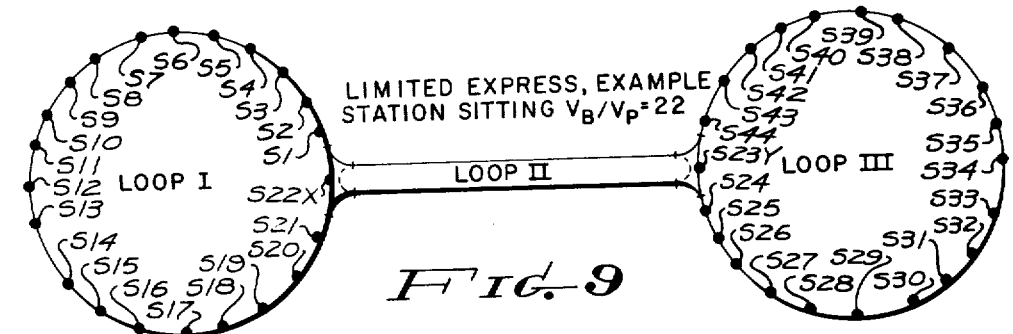
FIG. 9 is a diagrammatical view, similar to FIG. 8, but showing a limited express connection between two multiple station loops.

It is important to note that this latter approach allows a much greater concentration of service in the local loops for a given set of conditions. For example, if the same conditions were assumed to apply in Loops I and III as were assumed in the equal demand illustration, i.e., $V_b/V_p = 22$, a route with 21 stations per loop (as illustrated in FIG. 9) could be utilized without degrading system mass flow. This approach would utilize the 22nd "locations" in each loop as dummies for switching and routing express cars. Thus, out of each cycle of 22 car loading opportunities at each station, one car would be loaded for the transfer point, X in Loop I, and Y in Loop III. This car would be the same one out of each cycle of 22 opportunities. Thus, the mechanisms at point X and Y would transfer and accelerate every 22nd cars; i.e., cars targeted for one of the dummy stations.

Since all the express cars will then be positioned at the same point in the repetitive 22 car sequences on Loops I and III, an additional form of sequencing must be introduced to segregate these cars to separate destinations. This can be accomplished simply by having each station remove an express car every 21st cycle (for the example shown). For this to work, the loading sequence of express cars must be indexed so that in each successive cycle of car loadings, the express car that is loaded will be targeted for a different station. For example, the loading sequence at Station 21 would be as follows:

Stations 1, 2, 3, . . . 20, 21, 23, 1, 2, 3, . . . 20, 21, 24, 1, 2, 3, . . . 20, 21, 25, . . .

The pattern of cars that would result on Loops I and III would be the standard pattern for 22 station complexes and the pattern on Loop II would be one car followed by ($V_b$ Loop II/$V_b$ Loops I and III) (21) spaces.

3. OTHER VARIATIONS

Figures 10, 11:
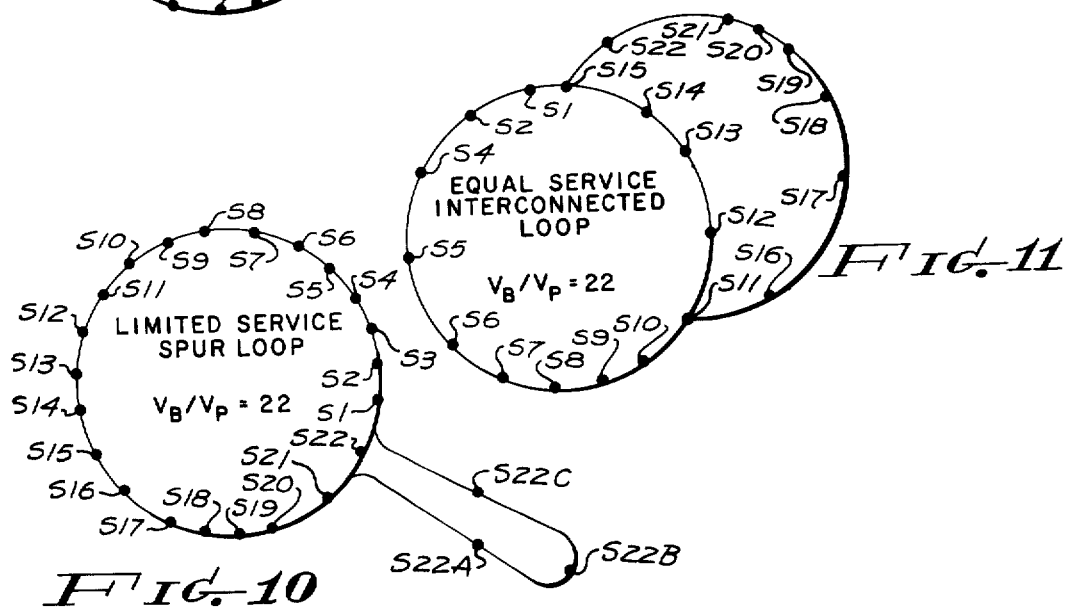
FIG. 10 is a diagrammatical plan view, showing a simple loop with a spur.
FIG. 11 is a fragmentary diagrammatical plan view, showing two station loops joined together.

Using the same approaches discussed above, numerous variations can be introduced into a basic route structure of the form illustrated in FIG. 7. For example, spur lines providing service to outlying points could be added as shown in FIG. 10. If the switching points for these spur lines are treated as dummy stations in the same manner as discussed in the previous section, the mass flow in the spurs will be less than that in the main loops. Such an approach could be ideal for initiating service to an expanding area that is not yet generating a level of demand equal to more densely populated sections.

Alternatively, spur lines or connected loops of the form illustrated in FIG. 11 could be treated in the same manner as was discussed in connection with FIG. 8. That is, equal service could be provided to all points by loading a complete complement of cars at each station and simply switching the appropriate cars onto and off of the interconnected loops.

The concept of synchronized sequence of loading and unloading operations and the mechanisms for implementing this concept are compatible with a number of different philosophies of system operation. Some of the variations possible have already been presented within the context of routing flexibility. However, each of these variations was discussed under the assumption that the beltway and platform velocities were adjusted so that $V_b/V_p$ = number of stations. If this equality does not exist, the sequencing operations could be adjusted to reflect various specific situations.

For example, an alternative would exist if round-trip cars were deleted and the $V_b/V_p$ ratio remained equal to the number of stations. This would mean that the openings on the main beltway reserved for round-trip cars would be free for other uses if appropriate loading and unloading sequences were adopted. One possibility for utilizing this capability would be to increase service between specific pairs of stations. In lieu of loading a round-trip car, each station would load an extra car targeted for its "paired" station. This would necessitate a modification in the pattern of loading at each of these stations since the round-trip opening that is pre-targeted for its "paired" station is not the same opening that is pre-targeted for itself. Therefore, there would be a pre-planned "hiccough" in the loading sequence at such stations. Cars would be loaded at some multiple (K) of $n + 1$ car openings until the added car that replaced the round-trip car was loaded. At this point, a different interval, $i$, would be required to load the proper opening. Then, an interval, $j$, would be required to get the loading sequence back into proper synchronization for the regular loadings. The sum of $i + j$ must be equal to K $(2n + 2)$ car openings.

Another alternative, if round-trip cars are deleted, is the simple addition of another station in the network. The $V_b/V_p$ ratio remains equal to the number of stations loaded in each repeating pattern from each station; however, the total number of stations becomes at least: $V_b/V_p + 1$.

Other possible traffic variations would occur when the number of physical station locations exceed the $V_b/V_p$ ratio. For example, if $V_b/V_p = 22$ and the number of stations is 44, several loading sequences are possible. Each station could provide service to only one-half of the stations. Alternatively, service could be maintained to all stations at one-half the maximum frequency. Other variations between these extremes are possible.

Reference is now directed to FIG. 12, which indicates diagrammatically in the manner of FIG. 1, a portion of an 11 station loop. That portion of the loop between S5 — S5 of FIG. 12 represents a portion of the loop within station 5, disposed laterally of that portion of the station in which cars are removed from the chain of carriers, decelerated and deposited on the station platform. FIGS. 13, 14 and 22 thus show a constantly moving car conveyor system. To simplify the illustration, the cars and the carriers are shown merely as circles.

Before describing in detail the car conveyor system, reference is directed to FIGS. 31 and 32, which illustrate one embodiment of the track carriers and passenger cars. For purposes of illustration, the track 50 is shown as comprising a pair of conventional rails 72. Each carrier 51 includes a supporting or base frame 73, having wheels 74 which ride on the rails 72. The supporting frames are joined end to end by pivotal connections 75. Mounted under each frame is a gear rack 76. Disposed at appropriate intervals between the rails 72 is a series of drive motors 77, each having a driving gear 78, which engage the gear racks 76 is sequence so that the chain of carriers moves continuously, preferably at a constant speed.

It should be noted that except for the fact that the carriers are connected end to end to form a complete or endless loop on the track, and that the track itself is an endless loop, the track and the carriers may be considered as conventional. That is, in place of the particular drive shown, each or selected carriers may be provided with conventional electric motors which drive their wheels, electricity being supplied by a conventional third rail system. Still further, the track may be any of the various monorails and the carriers or more particularly their supporting frames may be adapted thereto. Insofar as the present invention is concerned, it is desirable that the carriers and the passenger cars be relatively small. For example, the passenger cars may be arranged to seat six to eight passengers. It is essential to the embodiment of the invention illustrated and described that the passenger cars be removable from and be returned to the carriers and that each car fit all of the carriers.

For purposes of illustration, each carrier may include a platform 79, secured to the supporting frame 73 and provided with hollow upwardly extending keying bosses 80 and 81. Each passenger car 52 may be essentially square in plan and provided with a conventional sliding door 82. Inside, the passenger car is provided with seats 83 and 84, which are hollow so as to form sockets that mate with the keying bosses 80 and 81.

Each passenger car is provided with a pair of hanger bars 85, mounted on hanger supports 86. The hanger supports are preferably pivotable or foldable between an operative and an inoperative position, and moved from one position to the other by a suitable control, not shown. More particularly, the hangers move into operative position as the passenger car reaches its designated station.

Reference is again directed to FIGS. 13, 14 and 22, which illustrate a car conveying system which in order to simplify the illustration is shown as covered by a track supporting plate 87. An overhead car suspension beam 88 is provided for each car to be transferred to the station. The suspension beam is provided with a pair of hooks 89, which engage the hanger bars 85.

Each beam is supported from a pair of wheeled suspension trucks 90 by pivot shafts 91. The suspension trucks 90 travel in an endless suspension track 92 underlying the track supporting plate structure 87, as illustrated in FIGS. 28 and 32.

Each car suspension beam is provided with a sleeve 93 extending transverse to the suspension beam and receiving a slide pin 94. The slide pins of adjacent beams 88 are connected by a set of spacer links 95. The spacer links are joined to each other by vertical pivot shafts 96, each suspended from a wheeled suspension truck 97. Alternate trucks ride in a supporting track 98 adjacent the track 92, and the remaining trucks 97 ride in a third supporting track 98. At appropriate intervals a pivot shaft 96, associated with a truck riding in the track 97, is provided with a depending extension 100 connected to a slide pin 94. The spacing between the tracks 98 and 99 varies between a close spacing wherein the overhead car suspension beams 88 are separated a maximum distance and extended spacing which causes the beams 88 to assume an essentially end to end relation. Also, the effect of moving the tracks from their adjacent relation to their extended relation to decelerate the beams 88 and the cars supported thereby.

The moving parts of the car conveying system comprising suspension trucks 90, 97 and links 95 and beams 88 may be driven by various means. For purposes of illustration, each suspension beam 88 is shown as provided with a rack 102, engaged by appropriately located gear motors 103, the speeds of which are synchronized for the desired speed of the beams 88.

The car conveying system is in the form of an elongated loop divided functionally into a hook maneuvering reach 104, shown in FIG. 13; a car lifting reach 105; a car translating reach 106, shown in FIG. 14; a car decelerating reach 107, beginning in FIG. 14 and continuing in FIG. 22; a car placement reach 108, a hook disengaging reach 109, a first return loop 110; an acceleration reach 111, all shown in FIG. 22; a high speed return reach 112; a decelerating reach 113; a second return loop 114; and an accelerating reach 115, shown in FIG. 13, accelerating reach 115 terminating at the beginning of the hook maneuvering reach 104, Beginning just before the car placement reach 108, shown in FIG. 22, there is provided a moving station platform 116, traveling at a constant relatively low speed corresponding to the speed of the car suspension beams 88 and the passenger cars 52 when they have been decelerated. The station platform 116 is substantially wider than the passenger cars so as to provide a walkway 117 in front of the cars so that passengers may step from or into the passenger cars without experiencing change in momentum. The speed of the platform 116 and its walkway 117 may be slow enough that passengers may transfer between the moving walkway 117 and a contiguous non-moving walkway, not shown, without difficulty.

The car conveying system, as shown particularly in FIGS. 13, 14 and 22 is duplicated at the opposite end of the station platform 116, and thus is not illustrated. More particularly, the second car conveying system moves in the opposite direction; that is, the reach corresponding to reach 109 becomes a hook engaging instead of disengaging reach, the reach corresponding to the placement reach 108 lifts the bars from the platform, the next reach corresponding to reach 107 accelerates the cars to carrier speed, and continuing, the next reach 106 translates the cars onto an unoccupied carrier, and finally the reach corresponding to the reach 104 disengages the passenger car.

In order to transfer passenger cars from one chain of carriers to another faster or slower moving chain of carriers, essentially the same car conveyor system shown in FIGS. 13 through 32 may be used by substituting the second carrier chain for the moving belt 116 and by providing appropriately different spacing between the cars so as to be received in the unoccupied spaces of the second carrier chain.

Reference is directed to FIG. 33. If needed, the carriers 51 may accelerate as they leave the station and decelerate as they approach the next station, so as to increase the speed of movement between stations. This may be accomplished by providing links 118 between the carriers corresponding to the links 95 of the conveyor systems in each station. The links 118 are connected by pivots 119 which ride in guiderails 120, corresponding to the guiderails 99. As the carriers 51 approach the station, the guiderails diverge, causing the carriers 51 to move closer together, with corresponding reduction in speed. Conversely, as the carriers leave a station, the rails cause the pivots to urge the carriers further apart, with corresponding increase in speed.

Reference is now directed to FIG. 35. It is highly desirable that means be provided to abort or remove from the system a car should something be wrong; for example, should the car doors remain open, or some object, even an intended passenger be caught in the doors, the car should not move back into the main line. This is readily accomplished by control of the bars 85, which as shown in FIG. 31, are movable between an inoperative position and an operative position. Thus, should the car not be in condition for return to the main line, the bars 85 may be caused to remain in their inoperative position, so that instead of being picked up by the overhead conveyor mechanism, the car remains on the platform 116 until clear of the mechanism which returns the cars to the main line. Beyond this point, the cars may move onto a diverting conveyor 121, which may be a roller conveyor, so that the cars may roll to a stop. The diverting conveyor may be of sufficient length to receive several cars, if desired.

In order to return the car to the system, a conveyor loop 122, which may be an overhead conveyor, having hooks corresponding to the hooks 89 may be used. The conveyor loop 122 includes a reach which extends to the entrance end of the belt 116. The return reach, not shown, may be offset upwardly to clear other operating mechanism. As there are occasions when it is desired to store extra cars, the conveyors 121 and 122 may be used for this purpose.

Reference is now directed to FIGS. 36 and 37. The construction so far described has been directed to a transportation system, intended to handle pedestrians. The system is equally applicable to the handling of cargo, which may be carried on suitable pallets; or, in fact, may be arranged to handled special self-propelled vehicles. In the latter case, the vehicles may be independently driven from various points of origin to a station, delivered to a corresponding car, and transported in the system in the same manner as a pedestrian, until delivered to a selected station, whereupon, after removal from the system, the vehicle may be driven away. In the case of cargo, preferably mounted on pallets, trucks or other conventional transporting means may bring the pallets to the stations, and receive the pallets therefrom.

The transportation system may be devoted exclusively to the carrying of cargo or vehicles, or both, or may also include components for handling pedestrians. In the latter case, the cars carrying cargo or vehicles would be interspersed between the pedestrian cars when on the main aline, but would be separated from each other in a common station, or delivered to independent stations.

In the case of pedestrians, the pedestrians step on a moving belt 116; in the case of vehicles, the vehicles may be driven onto a moving belt corresponding to the belt 116. This maneuver is readily made if the speed of the belt is relatively slow. Similarly, forklifts or other cargo carrying vehicles may be driven onto the belt 116 so as to deposit cargo in appropriate cars.

It is preferred, however, particularly if the volume of cargo or vehicles is relatively large, to remove the cars from the belt 116, bring the cars to a halt, remove the cargo or vehicle, and then reroute the cars to pickup stations. More particularly, this may be accomplished by means shown in FIGS. 36, 37 and 38. For purposes of illustration, a series of overhead rotating conveyors 123 overlie the belt conveyor 116. In this case, the apron portion 117 is omitted. Each rotating conveyor includes suspension means 124, similar to the hooks 89 and their associated mechanism. The hooks are rotated at a speed to match the movement of the cars on the belt 116, and the hooks are operated to descend, engage the bars 85, lift a car, and rotate it clear of the belt 116, then, lower the car onto a conveyor 125, which may be a roller conveyor, whereupon the hooks release the car and raise for return to a position to engage another car. In the meantime, the car rolls to a stop. If the car carries cargo, a conventional forklift or the like may move the cargo from the car. If the car carries a vehicle, indicated idagrammatically by 126, the vehicle may be driven from the car. The empty cars are then picked up by a suitable overhead conveyor 127 for reloading.

While this operation could be accomplished by a single conveyor 123, or its equivalent, it is preferred to separate the cars, hence a series of conveyors are used. In the construction illustrated in FIG. 36, four such conveyors are provided, each arranged to pick up every fourth car. If it is desired that, for example, every other car on the main line be devoted to vehicles, then pedestrians may disembark from passenger cars prior to movement of the cars into position for engagement by the conveyors 125, in which case, where only four sets of cars are involved, only two conveyors 125 would be needed. Still further, one conveyor could be devoted to cargo, while the others do the handling of vehicles. While a simplified system is described, it should be understood that in practice the sets of conveyors may be greater than four, increasing the number devoted to each type of service; pedestrian, cargo or vehicle.

As suggested in connection with FIG. 35, an aborting mechanism may be associated with the terminal end, not shown, of the belt 116, as represented in FIG. 36.

Figure 38:
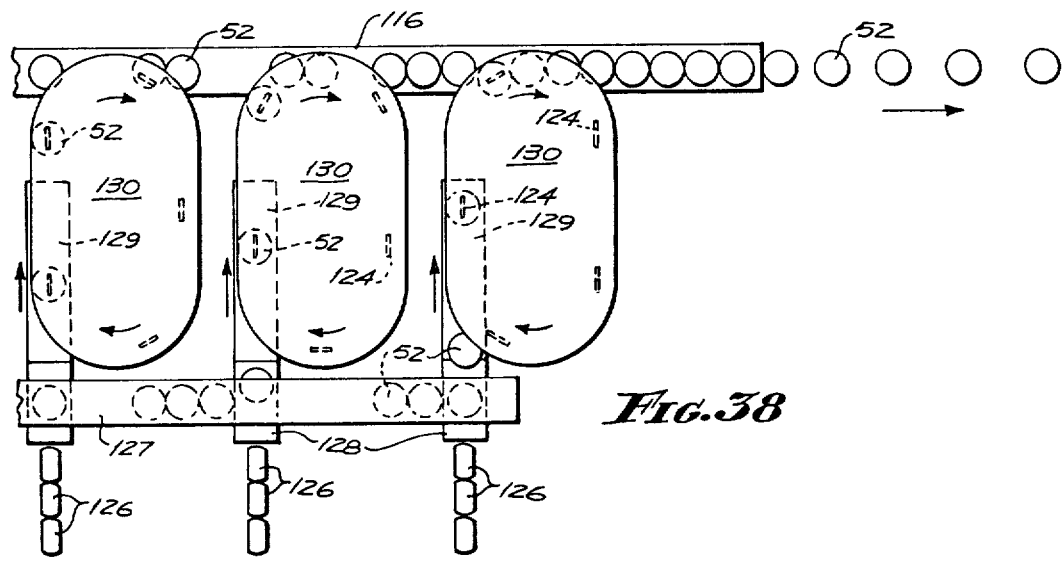
FIG. 38 is a fragmentary diagrammatical view of a station, showing particularly the means of loading cargo or vehicles onto cars for transportation in the system.

Reference is now directed to FIG. 38. The arrangement here illustrated pertains to the receiving end of the station. Here, the overhead conveyor 127 delivers the cars to a series of locations in which each location may correspond to a selected station. The cars are deposited on intermittently operated receiving conveyors 128. Vehicles 126 or cargo are driven on or placed in the cars. The receiving conveyors align with transfer conveyors 129, which pass under overhead conveyor loops 130, having suspension means 124, so that the cars may be picked from the conveyors 129. The overhead conveyor loops 130 pass over a belt 116, preferably separate from the belt employed in connection with the conveyors 123, and shown in FIG. 36. The cars deposited on the belt are picked up by a conveyor, not shown, for acceleration and delivery to the main line, comprising the chain of carriers, in the manner previously described. As pointed out previously, a portion of the cars may be devoted to pedestrian use, in which case the boarding area is located between the last overhead conveyor loop 130 and the conveyor which transfers the cars from the station to the main line.

Figure 39:
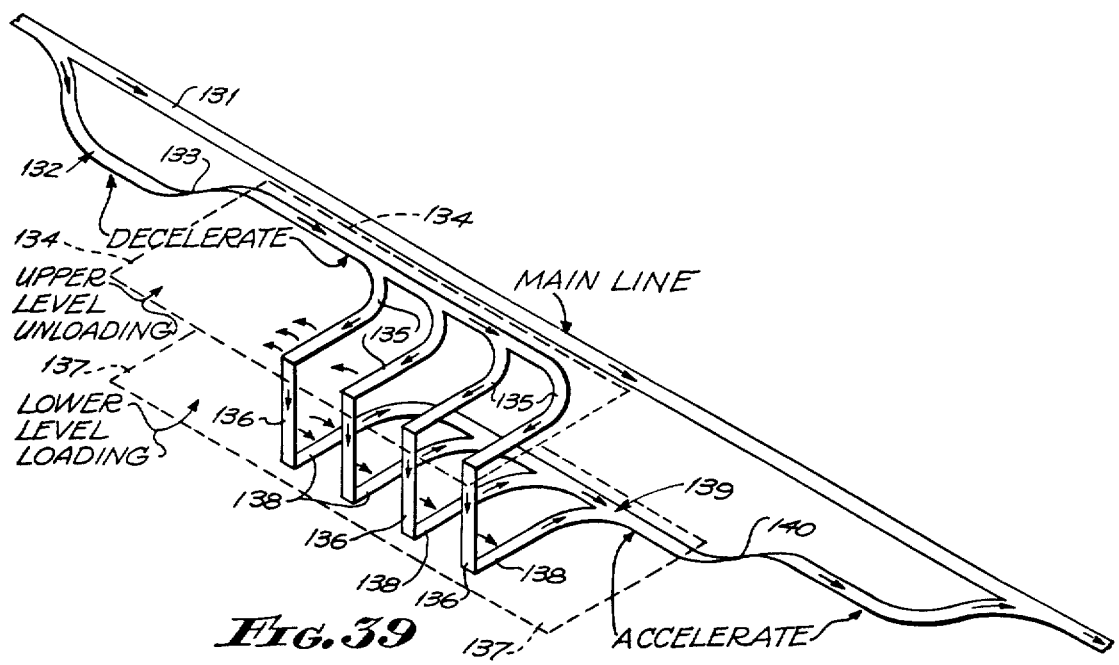
FIG. 39 is a diagrammatical perspective view of a station, indicating the manner in which unloading may occur at one level and loading may occur at a second level.

Reference is now directed to FIG. 39. In the previous embodiments, it is considered that the station occupied essentially a single level. It is feasible, however, to arrange the station so that incoming cars are delivered at an upper level, unloaded, then lowered to a second level, reloaded, and returned to the main line. More specifically, there is represented in FIG. 39 a main line path 131, having the chain of carriers as previously described, an entrance path 132, having appropriate conveyor or car handling means as previously described, and including a decelerating section 133. The entrance path 132 is directed to an upper level 134, and terminates in a set of unloading branches 135, which may be of the type described in FIG. 37. In place of the conveyor 127, vertical conveyors 136 deliver the cars to a lower level 137, having loading branches 138, corresponding to those shown in FIG. 38, which connect to an exit path 139, connected with the main line path 131 and including an accelerating section 140.

This would be a particularly convenient embodiment if it were desired to incorporate a passenger demand input during the loading process. Since the cars would be decelerated to zero velocity, then transferred to another level, in effect, a holding zone will have been inserted into station facilities. This holding zone, if made large enough, could allow a certain number of cars to be held for longer periods than others and still provide adequate room for arriving cars. Thus, within the capacity limits of the holding zone, demand operations could be provided by incorporating destination buttons in the cars in a manner similar to an elevator. Entering passengers could then indicate their destination and their car would be accelerated up to the velocity of the track loop at the next time that the pre-synchronized pattern would allow.

In this manner, a higher sensitivity to demand can be incorporated into station loading operations while retaining the high mass flow without interference with the synchronized scheduling on the track loop. It should be noted, however, that the primary advantage of such operation would be an occasional reduction in the number of cars in service or perhaps psychological appeal to some passengers. The in-station interference that will result from such demand operations will degrade the performance potential that could be realized from totally programmed operations.

The system thus far described involves a cyclical interval (n) of the operation defined by the ratio of the rate at which cars pass the transfer point to the station to the rate at which input-output operations occur from the station boarding area. In a system utilizing a physical, main line carrier moving at velocity $V_b$ and a station moving platform moving at velocity $V_p$, the interval $n = V_b/V_p$. If the main line removal operations for a single station then occur at intervals of $n$ cars (or multiples thereof) and main line replacement operations occur at intervals of $n+1$ cars (or multiples thereof), synchronized scheduling will result with the characteristics previously described. (The removal sequence must, of course, include a void in each cycle to balance input-output.) The maximum density of main line loading that can be achieved is 50 percent — — — which is still considerably higher than the operational density that can be achieved with any non-synchronized approach.

By a simple reversal of parts, a "reverse image" sequence can be employed which generates identical results. In the reverse image, removal from the main line must occur at intervals of $n+1$ cars (or multiples thereof) and replacement at intervals of $n$ cars (or multiples thereof). One void per cycle must then be left in the replacement process. In terms of the equations previously submitted: $I_{LOAD} = K(V_b/V_p)l_c$ and $I_{UNLOAD} = K(V_b/V_p + 1)l_c$. That is, the equations for $I_{LOAD}$ and $I_{UNLOAD}$ are reversed with respect to the formula previously set forth. This approach also results in 50 percent maximum main line density using single stations.

As a consequence of the reverse image, the pattern of voids and clumps of vehicles on the main line that result from the standard and "reverse" processes are exactly complementary. That is, the 50 percent of spaces that the reverse system uses is the 50 percent that the "standard" system does not use and vice versa. Therefore, both systems can be used simultaneously resulting in a totally fully main line. When both systems are used twice as many boarding areas are required since the standard and reverse system cannot share boarding areas under full loading conditions. Of course, the different boarding areas could co-exist with one set of walls — one "station" — as long as they do not physically overlap. More specifically, with reference to FIG. 34, the cars used in the reverse system are designated A, B and C corresponding to cars 1, 2 and 3 of the standard system. It will be seen that between stations, all carriers are filled. Only on passing through a station are cars removed and replaced.

The variations in operation of the mass transportation system are well suited to special conditions, for example:

In some installations for major cities, there may be transit trip variations which create infrequent yet heavy, predictable demands, e.g., sports events. Any one of the following operational methods could be employed to satisfy such heavy transient demand conditions, but in any specific installation it is expected that operational and economic trade-offs will yield a preferred solution.

METHOD NO. 1

Unaltered Pattern

A system-wide pattern may be established where the capacity is sized to accommodate maximum demands at all stations at all times. In the case of stations at stadiums, for example, the system continuously "feeds" vehicles to it based upon its heaviest demand condition. Except for a few hours on scheduled "game" days, it is obvious that the capacity provided at the stadium stations will greatly exceed normal demand.

METHOD NO. 2

Reverse-Image Added

If a nominal single pattern is employed system-wide, as previously stated, only 50 percent of the available spaces on the main line are used. A small portion of the reverse-image pattern could be employed (i.e., superimposed) to feed stations which are at other times inoperative. This method will require the addition of special boarding areas at all of the "feeding" stations; however, if there are many heavy transient demand areas within the network, such an approach might be operationally and economically preferable.

METHOD NO. 3

Altered Pattern

This method may be employed in large installations where the normal day-to-day peak-hour demands nearly saturate the system capacity. Fortunately, most heavy transient peaks (such as sports events) do not occur at the same times as normal peak demands and therefore service could be curtailed (or discontinued) at some stations and increased (or initiated) at others, e.g., stadium, music center, etc. This will require an alteration of the normal operating pattern to a new system-wide pattern and is accomplished as follows: As suggested in reference to FIG. 35, each station "aborts" the loading of up to one complete station-cycle of vehicles, so that the new loading operations coincide with the voids required for the new pattern. This change in loading operations would have to occur in a sequential manner around the network of stations. Unloading operations at the stations, where service levels are changed, must be adjusted to reflect the revised pattern to ensure that the input-output balance is maintained.

While particular embodiments of this invention have been shown and described, it is not intended to limit the same to the details of the constructions or methods set forth, but instead, the inventor embraces such changes, modifications as well as the methods which come within the purview of the appended claims.

We claim:
1. A transportation system, comprising:
   a. a series of stations, each including means for receiving cars and means for delivering cars;
   b. a continuously movable loop connecting the stations in sequential order, the loop including a plurality of car receiving locations divided into sets, the number of sets corresponding in number to the stations, and the locations constituting each set being reserved only for cars destined for a selected station;
   c. a multiplicity of cars for removable reception at said locations and at said stations, the cars being divided into sets corresponding in number and sequence to the number and sequence of the stations, the cars of each set being destined for delivery only to a single selected station and received only at the corresponding set of locations;
   d. said cars, when received in any station, being reassignable to other sets for delivery to corresponding sets of locations.

2. A transportation system, as defined in claim 1, which further comprises:
   a. a plurality of loops with corresponding stations and cars;
   b. and means for transferring cars from one loop to another.

3. A transportation system, as defined in claim 1, which further comprises:
   a. at least a pair of spaced loops with corresponding stations and cars;
   b. a connecting continuously movable loop joining the spaced loops, the connecting loop being movable at a higher speed than the spaced loops;
   c. and means for transferring cars between the spaced loops and the connecting loop.

4. A transportation system, as defined in claim 1, which further comprises:
   a. at least a pair of loops continuously movable in opposite directions;
   b. and each station having means for receiving cars from and delivering cars to each loop.

5. A transportation system, as defined in claim 1, wherein:
   a. the conditions for sequencing cars from the loop to a station and from the station to the loop are in accordance with the following formulas:
   $$^lLOAD = K(V_b/V_p + 1)l_c$$
   $$^lUNLOAD = K(V_b/V_p)l_c$$
   $$n = V_b/V_p$$
   b. where:
   $V_b$ = The velocity of the cars in the loop at least in the vicinity of the stations
   $V_p$ = The decelerated velocity of the cars as they enter and leave the loading and unloading portions of each station
   $l_c$ = The center-to-center length between contiguous cars
   $K$ = Car density constant, 50 percent loop density between stations when $K = 1$
   $n$ = The maximum number of cars targeted for separate station destinations that can be loaded at any station before the pattern of cars and spaces on the loop repeats itself at that station
   $^lLOAD$ = The distance between the spaces in the loop that are filled by cars from a given station
   $^lUNLOAD$ = The distance between spaces in the loop from which cars may be unloaded at a given station.

6. A transportation system, as defined in claim 1 wherein:
   a. the pattern of occupied and unoccupied locations for 50 percent line density at least in the region of approach to a station is as follows:
   $n$ cars (the first of which is targeted for station $m$) followed by $n$ empty locations; then 1 car targeted for station $m$ followed by $n-1$ empty locations; then two cars (the first of which is targeted for station $m$) followed by $n-2$ empty locations; and so forth out to $n-1$ cars (the first of which is targeted for station $m$) followed by 1 empty location; and then repeating the pattern of $n$ cars, $n$ empty locations, etc. in which $n = (V_b/V_p)$
   b. where:
   $V_b$ = The velocity of the cars in the loop at least in the vicinity of the stations
   $V_p$ = The decelerated velocity of the cars as they enter and leave the car receiving means and car delivery means of each station
   $n$ = any station in the loop.

7. A transportation system, as defined in claim 6, wherein:
   a. two groups of stations and two groups of cars are provided;
   b. and the locations between stations unoccupied by one group of cars are occupied by the second group of cars.

8. A transportation system, as defined in claim 1, wherein;
   a. the loop includes means for decelerating the cars as they approach selected stations and for accelerating the cars as they depart therefrom.

9. A transportation system, as defined in claim 1, wherein:
   a. each station includes a car decelerating means, a car accelerating means, and a car unloading and loading means between the decelerating and accelerating means.

10. A transportation system, as defined in claim 9, wherein:
    a. means is provided to divert cars from the loading means to prevent cars not in condition for delivery to the loop for return thereto;
    b. and means is provided for subsequent return of such cars to the loading means.

11. A transportation system, as defined in claim 9, which further comprises:

a. means at selected stations for diverting cars from the loading means for storage therein during periods of reduced demand, and subsequent return when the demand increases.

12. A transportation system, as defined in claim 9, wherein:
   a. the unloading and loading means includes passenger receiving means movable in synchronism with the cars and permits disembarking and embarking.

13. A transportation system, as defined in claim 9, wherein:
   a. at least some of the cars are adapted to carry removable cargo;
   b. the unloading means includes means for removing cargo from the transporting system;
   c. the loading means includes means for delivering cargo to unload cars.

14. A transportation system, comprising:
   a. at least one continuously moving main loop;
   b. a series of stations spaced about the main loop, each station including a continuously movable car removing loop having a portion movable in synchronism with the main loop and a portion movable at a reduced speed, a continuously movable car returning loop also having a portion movable in synchronism with the main loop and a portion movable at a reduced speed, and a car unloading and a car loading means interposed between the reduced speed portions of the car removing loop and car returning loop;
   c. the main loop, removing loop and returning loop each including a plurality of car carriers joined together to form an endless chain of carriers;
   d. each main loop carrier having at least one car receiving location, said locations divided into sets, the number of sets corresponding in number to the stations, and the locations comprising each set being reserved only for cars destined for a selected station;
   e. a multiplicity of cars for removable reception by said carriers, the cars being divided into sets corresponding in number and sequence to the number and sequence of the stations, the cars of each set being destined for delivery only to a single selected station, and received only at the corresponding set of locations.

15. A transportation system, as defined in claim 14, wherein:
   a. the connections between the carriers are adapted to be extended or retraced thereby increasing or decreasing the distance between the carriers to effect increase or decrease in the rate of movement of the carriers.

16. A transportation system, as defined in claim 14, wherein:
   a. the pattern of occupied and unoccupied locations on the carriers of the main loop for 50 percent loop density at least in the region of approach to a station $m$ being as follows:
      $n$ cars (the first of which is targeted for station $m$) followed by $n$ empty locations; then 1 car targeted for station $m$ followed by $n-1$ empty locations; then two cars (the first of which is targeted for station $m$) followed by $n-2$ empty locations; and so forth out to $n-1$ cars (the first of which is targeted for station $m$) followed by 1 empty location; and then repeating the pattern of $n$ cars, $n$ empty locations, etc. in which: $n = (V_b/V_p)$
      $V_b = $ The approaching velocity of the cars in the loop
      $V_p = $ The velocity of the slow speed sections of the car receiving means and car delivery means
      $m = $ Any station in the loop.

17. A transportation system, as defined in claim 14, wherein:
   a. two groups of stations and two groups of cars are provided;
   b. and the locations unoccupied by the members of one group are occupied by the members of the other group.

18. A transportation system comprising:
   a. a continuously moving loop having means for removably receiving a plurality of cars in accordance with a predetermined pattern of occupied locations and unoccupied locations;
   b. a plurality of stations disposed in spaced relation about the loop;
   c. each station including a continuously moving car receiving means having a higher speed section and a lower speed section, the higher speed section moving in synchrocism with rate of travel of the moving loop and disposed in proximity therewith for removing selected cars therefrom;
   d. each station also including a continuously moving car delivery means having a lower speed section and a higher speed section, the higher speed section moving in synchrocism with the rate of travel of the moving loop and disposed in proximity therewith for returning cars to predetermined locations in the moving loop;
   e. and car handling means in each station for removing cars from the car receiving means and supplying cars to the car delivery means;
   f. the pattern of occupied and unoccupied locations for 50 percent loop density at least in the region of approach to a station being as follows:
      $n$ cars (the first of which is targed for station $m$) followed by $n$ empty locations; then 1 car targeted for station $m$ followed by $n-1$ empty locations; then two cars (the first of which is targeted for station $m$) followed by $n-2$ empty locations; and so forth out to $n-1$ cars (the first of which is targeted for station $m$) followed by 1 empty location; and then repeating the pattern of $n$ cars, $n$ empty locations, etc. in which $n = (V_b/V_p)$
   g. where:
      $V_b = $ The velocity of the cars in the loop at least in the vicinity of the stations
      $V_p = $ The decelerated velocity of the cars as they enter and leave the car receiving means and car delivery means of each station
      $m = $ any station in the loop.

19. A transportation system, as defined in claim 18, wherein:
   a. two groups of stations and two groups of cars are provided;
   b. and the locations unoccupied by the members of one group of cars are occupied by the members of the second group of cars.

* * * * *